United States Patent [19]

Fouquay et al.

[11] Patent Number: 6,090,883
[45] Date of Patent: Jul. 18, 2000

[54] PROCESS OF MANUFACTURE OF PHENOLIC RESINS FOR THE MANUFACTURE OF PRODUCTS CONTAINING GLASS FIBRES AND MINERAL FIBRES

[75] Inventors: Stephane Fouquay, Mont Saint-Aignan; Chantal Poulet, Chiry-Ourscamp; Jean-Marc Benoit, Saint Germain en Laye, all of France

[73] Assignee: Elf Atochem, France

[21] Appl. No.: 09/113,194

[22] Filed: Jul. 10, 1998

[30] Foreign Application Priority Data

Jul. 11, 1997 [FR] France ................................. 97 08854

[51] Int. Cl.⁷ .................................................. C08L 61/14
[52] U.S. Cl. ........................... 524/594; 524/436; 524/400; 524/541
[58] Field of Search .................................... 524/436, 400, 524/594, 541

[56] References Cited

U.S. PATENT DOCUMENTS

| 3,336,185 | 8/1967 | Helbing . | |
|---|---|---|---|
| 3,933,427 | 1/1976 | Bohnsack et al. | 422/15 |
| 3,935,139 | 1/1976 | Ashall | 524/594 |
| 4,303,568 | 12/1981 | May et al. | 524/417 |
| 4,904,516 | 2/1990 | Creamer | 524/541 |
| 4,923,634 | 5/1990 | Hoots et al. | 252/389.2 |

FOREIGN PATENT DOCUMENTS 606164  12/1977  Switzerland .

OTHER PUBLICATIONS

French Search Report dated Feb. 13, 1998.

*Primary Examiner*—David W. Wu
*Assistant Examiner*—Ling Sui Choi

[57] ABSTRACT

A process of manufacture of phenolic resins using calcium catalysis not comprising any filtration stage. This result is obtained by holding back the precipitation of the calcium species by the combined use of a chelatant/sequestrant and of a dispersing anionic polymer. Resins which are stable in storage and with excellent water tolerance.

15 Claims, No Drawings

PROCESS OF MANUFACTURE OF PHENOLIC RESINS FOR THE MANUFACTURE OF PRODUCTS CONTAINING GLASS FIBRES AND MINERAL FIBRES

FIELD OF THE INVENTION

In the production of soundproofing and lagging materials such as panels and mats made of inorganic mineral fibres (glass and rock wools, diabase, basalt, slag, glass), use is made of phenolic resins, the purpose of which is to increase their resistance to atmospheric or chemical attacks. These resins, which are usually employed in quantities of 3 to 8% of dry resin relative to the mass of the mineral fibres, are products of controlled condensation of phenol and formaldehyde in aqueous solution, a condensation carried out in the presence of a water-soluble alkaline catalyst, and which consist essentially of phenol-alcohols with one or two methylol-phenol nuclei. Furthermore, these phenolic resins are commonly modified with urea, to lower their binder costs, and this has the additional advantage of binding the free formaldehyde.

BACKGROUND OF THE INVENTION

Originally, it was the aqueous solutions of alkali metal hydroxides, above all soda lye, that were used as catalysts for the condensation reaction. The quality of the mineral wools prepared with such binders is appreciably spoiled under the effect of moisture. Even a neutralization of the alkaline fraction of these resins at the end of condensation, for example with dilute sulphuric acid, has not produced any appreciable improvement in the moisture resistance. This instability has been attributed to the presence in the finished material, even in the cured state, of soluble ash consisting of sodium oxide, sodium carbonate and/or sodium sulphate. Alkaline-earth metal hydroxides, in particular calcium hydroxide, have accordingly been employed as catalysts which have the advantage over the alkali metal hydroxides of being capable of being precipitated at the end of condensation, by the addition of dilute sulphuric or phosphoric acid, of carbon dioxide, of ammonium sulphate or of ammonium carbonate, and of being capable of being separated from the aqueous solution in the form of water-insoluble salts. With this operating technique, resins which are practically free from ash are obtained. Materials based on mineral fibres and prepared from these filtered resins have an excellent moisture resistance.

There is, however, a major disadvantage to the process described above: the insoluble precipitates thus formed must be removed by filtration; otherwise there is a risk of obstruction of the nozzles for distributing the resin when it is used. This filtration is a tedious operation which is accompanied by a loss of resin which is not insignificant; moreover, the dumping of the filter cake containing phenolic resins, and which can represent from 5 to 10% of the unfiltered reaction end product, is costly and nowadays constitutes a severe environmental problem.

Phenolic resins using alkaline-earth catalysis were therefore developed, in the preparation of which the alkaline-earth catalyst was neutralized in the form of insoluble species, but in such a way that its precipitation would not take place. Thus, use has been made of the introduction of sulphate and ammonium ions (EP 0 190 130—Rutgerswerke), but this, however, allows only a period of a few hours before the reappearance of calcium-containing precipitate, outweighs any possibility of transporting and stocking the resin and confines it to a utilization near the production site; or else the addition of the oxalic acid/protein emulsifier pair (U.S. Pat. No. 4,060,054—Monsanto), which retains the coalescence of the calcium precipitate in the form of oxalate but which, besides the presence of the protective colloid, may be detrimental to the quality of the agglomerates, causes a large increase in the viscosity of the product.

The unsolved problem is therefore that of obtaining industrially phenol/formalin resins using calcium catalysis, free of insoluble precipitate and therefore not requiring any filtration, and the stability of which is ensured over a period of 10 to 15 days corresponding to the actual stability of the resin between 10 and 15° C., while the stability with regard to the precipitation of the calcium ions which is aimed at in the present invention is longer than 1 month.

DESCRIPTION OF THE INVENTION

This result is attained according to the invention by virtue of a process for the preparation of phenol/formalin resins or of urea-modified phenol/formalin resins which includes:
  a condensation of phenol and formalin in the presence of alkaline-earth hydroxide, specially calcium hydroxide acting as condensing catalyst,
  an addition of urea
  the addition of a chelating/sequestering agent and of a dispersing anionic polymer.

The chelating/sequestering agent may consist of 2-phosphono-1,2,4-butanetricarboxylic acid (PBTA) (RN 37971-36-1), nitrilotriacetic acid (NTA), ethylenediaminetetraacetic acid (EDTA), diethylenetriaminepentaacetic acid (DPTA), aminophosphonates such as hydroxyethylidine-1, 1-diphosphonic acid (HEDPA) or equivalent products. PBTA and HEDPA, and rather PBTA are preferred.

Dispersing anionic polymers within the meaning of the present invention, which is also the commonplace meaning for a person skilled in the art, are water-soluble polymers which are capable of being adsorbed onto solid particles in aqueous medium and of causing and stabilizing their dispersion by an electrostatic effect, but which do not aggregate to form micelles and do not cause any appreciable lowering of the surface tension. Those corresponding to this definition are, in particular, lignosulphonates, polynaphthalenesulphonates, polyphosphonates, polyphosphates and carboxylic polymers. Ammonium, sodium and potassium lignosulphonates and polyacrylate homopolymers (PAA) or co- other ter-polymers are preferred. The sterically bulby group containing copolymers and terpolymers, such as acrylic acid/2-acrylamido-2-methylpropanesulfonic acid copolymers (AA:AS), acrylic acid/hydroxypropyl acrylate (AA:HPA) or acrylic acid/dumethylitaconate (AA:DIM), and the acrylic acid/2-acrylamido-2-methylpropanesulfonic acid/styrensulfonic acid (AA:AS:SS) are preferred.

These products are employed in the following quantities: chelating/sequestering agents in a proportion of 0.3 to 1.0% by weight and, in the case of PBTA, of 0.5 to 0.6%, and dispersing anionic polymers in a proportion of 0.1 to 1.0%, preferably, in the case of lignosulphonates or polyacrylates, of 0.1 to 0.5%.

The condensation reaction is conducted in the following conditions:
  condensation temperature lower than 100° C.,
  phenol/formaldehyde molar ratio of 1:1.3 to 1:4.0,
  in the presence of 0.5 to 10% of calcium hydroxide as catalyst, quantities calculated in relation to the quantity of phenol used, preferably between 4 and 6%, urea/phenol weight ratio lower than or at most equal to 1:1 and preferably from 0.4:1 to 0.6:1, pH maintained between 7.5 and 11.0, preferably between 8.5 and 10.5.

The adjustment of the pH is optional. If, however, it is desired to maintain it within the limits shown, this is preferably done with the aid of aqueous ammonia. Other basic, organic compounds can also be employed for this purpose, such as methylamine, ethylamine, isopropylamine, 1-propylamine, butylamine, dimethylamine, trimethylamine, diethylamine, triethylamine, ethanolamine, diethanolamine or triethanolamine.

It is noted that in this process no precipitating agent of the sulphuric, phosphoric or carbonic type is involved.

The resins thus prepared can be diluted. They tolerate the addition of various adhesion promoters, for example aminosilanes, in particular (3-aminopropyl)triethoxysilane, which is then employed in quantities of the order of 0.05 to 0.20% relative to the dry resin.

It is verified, for example by comparing the strengths without immersion or with immersion of coated sand bars, that the resins thus obtained exhibit a sufficient resistance to water, which is the condition of their quality for the manufacture of materials consisting of mineral fibres and of resins which are themselves resistant to water.

The process of preparation described above is a subject-matter of the invention. The resins thus obtained are novel and are also a subject-matter of the invention.

EXAMPLES

The nonlimiting examples which follow will make the invention easier to understand.

In these examples water-tolerance tests will be encountered. These tests are employed sometimes as a means of control of the manufacture of the resins (this is the salt water tolerance test), and sometimes as a characteristic of the commercial resin (deionized water tolerance is then involved). The test is based on the fact that the addition of water to a resin precipitates the high condensates, and this gives a useful indication of the degree of progress of the condensation reaction and the degree of condensation of the resin. For this purpose, 10 ml of resin are taken into a 500-ml conical flask, and water or salted water at 23° C. is added to it slowly and with gentle stirring until a permanent turbidity appears. The test is limited to the addition of 250 ml of water, at which quantity, in the absence of turbidity, the resin is assumed to have an infinite water tolerance. Otherwise, the volume of water added is taken as a measure of the water tolerance.

EXAMPLE 1

To a solution of 351 g of phenol in 175.5 g of water add 30.9 g of calcium hydroxide and then introduce over 1 hour, between 60–70° C., 717.8 g of formalin as 506% aqueous solution. Keep at a steady 70° C. until a salted water (solution containing 50 g NaCl/l) tolerance close to 1:25 at 23° C. is obtained. Cool to 60° C.

Introduce 112.5 g of water and 192 g of urea between 60 and 45° C. and keep within this temperature range for 30 minutes until the urea has dissolved completely, cool to 23° C. and successively add 0.5 to 0.6% of PBTA (from 1 to 1.2% of its commercial 50% aqueous solution, Bayhibit®AM from Bayer is taken) and 0.15% of sodium lignosulphonate (Vanisperse®CB powder from Borregaard Lignotech) in relation to the total weight of urea-modified phenolic resin solution; homogenization of the mixture is obtained virtually instantaneously.

The characteristics of the resin thus obtained are within the following limits:

| Solids content (170° C.) | 46 ± 0.5% |
|---|---|
| Viscosity (23° C.) | 25–30 mPa s |
| pH (23° C.) | 8.5–9 |
| DRT* at 130° C. | 95 to 120 seconds |
| Free phenol | 0.3 to 0.4% |
| Free formalin | approximately 0.3% |
| Deionized water tolerance | infinite |
| Colour | dark brown |
| Lifetime | approximately 15 days |

*DRT or Drying Resin Time is the fast control test of the reactivity of the heat-curable resins, widely employed for characterizing liquid phenolic resins.

The resin remains free from precipitate for at least a month.

EXAMPLE 2

To a solution of 351 g of phenol in 175.5 g of water add 30.9 g of calcium hydroxide and then introduce over 1 hour, between 60–70° C., 717.8 g of formalin as 50% aqueous solution. Keep at a steady 70° C. until a salted water (solution containing 110 g NaCl/l) tolerance close to 1:25 at 23° C. is obtained. Cool to 60° C.

Introduce 112.5 g of water and 192 g of urea between 60 and 45° C. and keep for 30 minutes within this temperature range until the urea has completely dissolved, cool to 23° C. and successively add 0.5 to 0.6% of PBTA (from 1 to 1.2% of its 506 aqueous solution, marketed under the name of Bayhibit®AM is taken) and 0.25% of ammonium polyacrylate (0.5% of the 50% solution marketed under the name of Coatex®P90 is taken) in relation to the total weight of urea-modified phenolic resin solution. Homogenization of the mixture is obtained virtually instantaneously.

The characteristics of the resin thus obtained are within the following limits:

| Solids content (170° C.) | 46 ± 0.5% |
|---|---|
| Viscosity (23° C.) | 25–30 mPa s |
| pH (23° C.) | 8.5–9 |
| DRT at 130° C. | 95 to 120" |
| Free phenol | 0.3 to 0.4% |
| Free formalin | approximately 0.3% |
| Water tolerance | infinite |
| Colour | dark brown |

EXAMPLE 3

Comparative, of a "Precipitated-Filtered" Resin

To a solution of 351 g of phenol in 175.5 g of water add 30.9 g of calcium hydroxide and then introduce over 1 hour, between 60–70° C., 717.8 g of formalin as 50% aqueous solution. Keep at a steady 70° C. until a salted water (solution containing 50 g NaCl/l) tolerance close to 1:25 at 23° C. is obtained. Cool to 60° C.

Add 112.5 g of water and 192 g of urea between 45 and 60° C., keep for 30 minutes in this temperature range until the urea has completely dissolved and then cool between 10 and 20° C. Slowly introduce 37% sulphuric acid until the resin solution reaches a pH of 7.0. A bulky precipitate of calcium sulphate is formed and is separated off by filtration. The resin solution, now freed from the precipitate, is adjusted with a 25% solution of aqueous ammonia in order to bring the pH to 8.5–9. The product obtained exhibits no precipitate and no precipitate is formed therein on storage over one month, well beyond the lifetime of the product, that is to say of the period of guarantee of conservation of the initial properties reported in the table below.

| | |
|---|---|
| Solids content (170° C.) | 46 ± 0.5% |
| Viscosity (23° C.) | 25–30 mPa s |
| pH (23° C.) | 8.5–9 |
| DRT at 130° C. | 90 to 120 seconds |
| Free phenol | 0.3–0.4% |
| Free formalin | approximately 0.3–0.5% |
| Water tolerance | infinite |
| Colour | dark brown |
| Lifetime | approximately 15 days |

EXAMPLE 4

Comparative

To a solution of 351 g of phenol in 178.5 g of water add 30.9 g of calcium hydroxide and then introduce over 1 hour, between 60–70° C., 717.8 g of formalin as 50% aqueous solution. Keep at a steady 70° C. until a salted water tolerance at 70° C. (solution containing 50 g of NaCl/l) close to 1:25 at 23° C. is measured on the product. Cool to 60° C.

Then introduce 112.5 g of water and 192 g of urea between 60 and 45° C. and keep for 30 minutes within this temperature range until the urea has completely dissolved. Cool between 10 and 20° C., adjust the pH to 9.8 with a 25% solution of aqueous ammonia and add 227 g of an aqueous solution of ammonium sulphate at a concentration of 25%.

The resin thus obtained has a stability of approximately one hour, which limits its use to only the site of use, without possibility either of transportation or of intermediate storage.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

What is claimed is:

1. Process for the manufacture of a urea-modified phenol-formaldehyde resin with low residual phenol and formalin contents, in aqueous solution not liable to the formation of a precipitate over periods of at least one month, comprising the steps of:
   a) condensing phenol and formalin in the presence of alkaline-earth hydroxides with addition of urea in a quantity wherein the urea/phenol weight ratio is less than or at most equal to 1:1, and
   b) adding a chelating/sequestering agent and a dispersing anionic polymer at the same time to the result of the condensation,
   wherein the chelating/sequestering agent and the dispersing anionic polymer are present in the resin in a proportion of 0.3 to 1.0% by weight and 0.1 to 1.0% by weight, in relation to total weight of resin solution, respectively.

2. Process according to claim 1, wherein the chelating/sequestering agent is 2-phosphono-1,2,4-butanetricarboxylic acid, nitrilotriacetic acid, ethylenediaminetetraacetic acid, diethylenetriaminepentaacetic acid or aminophosphonates.

3. Process according to claim 1, wherein the chelating/sequestering agent is 2-phosphono-1,2,4-butanetricarboxylic acid.

4. Process according to claim 1, wherein the chelating/sequestering agent is hydroxyethylidine-1,1-diphosphonic acid.

5. Process according to claim 1, wherein the dispersing anionic polymer is lignosulphonates, polynapthalenesulphonates, polyphosphonates, polyphosphates or carboxylic polymers.

6. Process according to claim 1, wherein the dispersing anionic polymer is a lignosulphonate.

7. Process according to claim 1, wherein the dispersing anionic polymer is an ammonium, sodium or potassium polyacrylate.

8. Process according to claim 1, wherein the dispersing anionic polymer is an ammonium, sodium or potassium acrylic co- or ter-polymer.

9. Process according to claim 8, wherein the acrylic co- or ter-polymers are sterically bulky group containing co- or ter-polymers, including ex-2-acrylamido-2-methylpropanesulfonic acid, ex-hydroxypropyl acrylate, ex-dimethylitaconate or ex-styrenesulfonic acid.

10. Aqueous compositions comprising urea-modified phenol-formaldehyde resins exhibiting no sign of precipitation on storage over a period of at least 10 days, the resin being the product of the condensation of phenol and of formalin in the presence of alkaline-earth hydroxide with addition of urea in a quantity, the urea/phenol weight ratio is lower than or at most equal to 1:1, wherein from 0.3 to 1% of chelating/sequestering agent and from 0.1 to 1.0% of dispersing anionic polymer, by weight relative to the resin have been added.

11. Phenolic resin compositions according to claim 10, wherein the chelating/sequestering agent is 2-phosphono-1,2,4-butanetricarboxylic acid or hydroxyethylidine-1,1-diphosphonic acid, and the dispersing anionic polymer is an ammonium, sodium or potassium lignosulphonate or polyacrylate or acrylic co- or ter-polymer.

12. Process according to claim 1, wherein the weight ratio is from 0.4:1 to 0.6:1.

13. Aqueous compositions according to claim 10, wherein the weight ratio is 0.4:1 to 0.6:1.

14. Process according to claim 1, wherein the hydroxide is calcium hydroxide.

15. Aqueous compositions according to claim 10, wherein the hydroxide is calcium hydroxide.

* * * * *

UNITED STATES PATENT AND TRADEMARK OFFICE
CERTIFICATE OF CORRECTION

PATENT NO. : 6,090,883
DATED : July 18, 2000
INVENTOR(S) : Fouquay et al.

It is certified that error appears in the above-identified patent and that said Letters Patent is hereby corrected as shown below:

<u>Title page,</u>
Item [73], Assignee, please delete "Elf Atochem, France" and insert the term -- CECA, S.A., Puteaux, France --

Signed and Sealed this

Tenth Day of May, 2005

JON W. DUDAS
*Director of the United States Patent and Trademark Office*